United States Patent [19]

Takahashi

[11] 4,431,292
[45] Feb. 14, 1984

[54] FILM FEEDING CIRCUIT

[75] Inventor: Akira Takahashi, Kawasaki, Japan

[73] Assignee: Ricoh Company, Ltd., Tokyo, Japan

[21] Appl. No.: 320,930

[22] Filed: Nov. 13, 1981

[30] Foreign Application Priority Data

| Nov. 18, 1980 [JP] | Japan | 55-162136 |
| Nov. 18, 1980 [JP] | Japan | 55-162137 |
| Nov. 18, 1980 [JP] | Japan | 55-162138 |
| Nov. 18, 1980 [JP] | Japan | 55-162139 |
| Nov. 18, 1980 [JP] | Japan | 55-162140 |

[51] Int. Cl.³ .......................... G03B 1/12; G03B 1/66
[52] U.S. Cl. ............................................. 354/173.11
[58] Field of Search ........................................ 354/173

[56] References Cited

U.S. PATENT DOCUMENTS 4,309,097 1/1982 Stemme et al. ............... 354/173

Primary Examiner—Michael L. Gellner
Attorney, Agent, or Firm—Oblon, Fisher, Spivak, McClelland & Maier

[57] ABSTRACT

A film feeding circuit operates to feed a film of a camera in response to a drive from a motor. Perforations formed in the film are detected at a given location, and counted by a counter. The count in the counter controls the energization of the motor. When the count reaches a predetermined number, the speed of movement of the film is reduced. In the absence of a film, the counter is counted by a pseudo signal. A power supply is turned off at the termination of a film feeding operation.

14 Claims, 13 Drawing Figures

F I G. 3
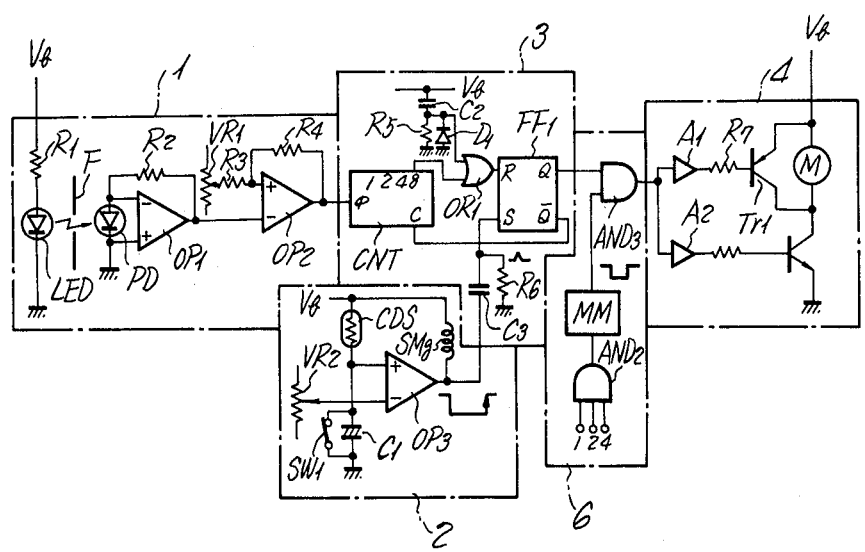
F I G. 5
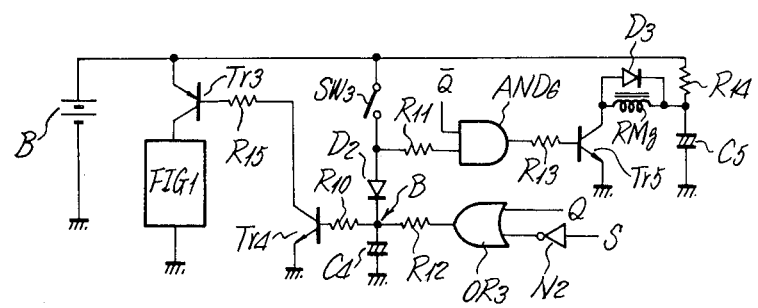

F I G. 4

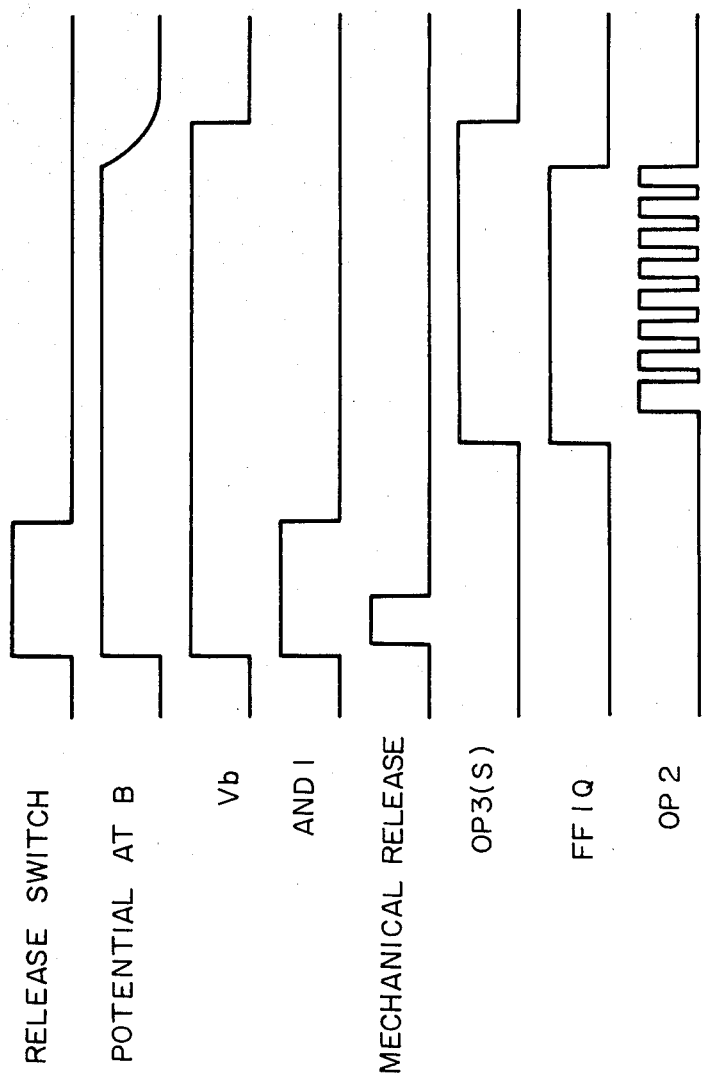

F I G. 8
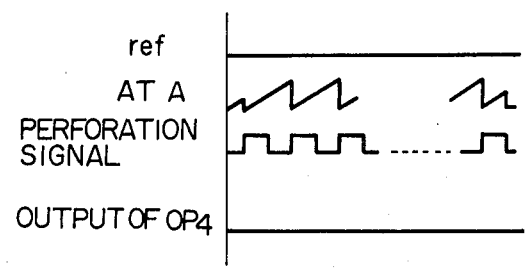
F I G. 9
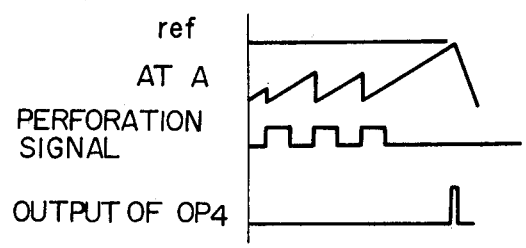

FILM FEEDING CIRCUIT

BACKGROUND OF THE INVENTION

This invention relates to a film feeding circuit for a camera.

Japanese Laid-Open Patent Application No. 121,524/74 discloses a film feeding system for a camera in which a motor is operated to rotate at its full speed to feed a film in response to the termination of a shutter operation while simultaneously perforations formed in the film are electrically detected at a given location to be counted by a counter so that when the count therein reaches a given value, the motor is deenergized, thus feeding the film by one frame. The system suffers from a disadvantage that when a stop instruction is produced as the count reaches a given value, the motor continues to coast to cause a film slip corresponding to a number of perforations, thus degrading the accuracy of stopping the film at a given point. Also, when no film is loaded in the camera to prevent perforations in the film from being detected, the motor, once started at the termination of a shutter operation, continues to be energized, thus disabling an operation of the camera. Furthermore, since a power supply is normally maintained on, there results undesirable, wasteful power dissipation when no film feeding operation takes place. Additionally, there must be provided some means which deenergizes the motor in response to a stop motion of the film while the motor continues to be energized, as occurs when a film feeding operation entirely completed, namely, after the last frame of film has been fed. To cope with this problem, a detecting resistor may be inserted in series circuit with the motor to detect an increase in the motor current which occurs as a result of the stop of the motion after the full length of the film has been fed, thereby terminating the energization of the motor. However, the insertion of the detecting resistor in series with the motor causes a sacrfice in the motor characteristics such as starting torque or speed-torque curve, and may additionally cause an erroneous detection of a high current upon starting the motor or a current flow during a fluctuation in the load, thus causing an erroneous deenergization of the motor. While a control in accordance with the content of a counter may be contemplated, a close control cannot be achieved since a single signal is produced by one perforation.

SUMMARY OF THE INVENTION

It is a first object of the invention to provide a film feeding circuit which causes the running speed of a film to be reduced before the film comes to a stop position. This reduces a slip in the film and improves the accuracy of the stop position of the film.

It is another object of the invention to provide a film feeding circuit in which a pseudo-perforation signal is supplied to a counter during a film feed operation if any perforation of a film is not detected. In accordance with this aspect of the invention, when the full length of the film has been fed and no perforation can be detected any longer, a film winding operation can be performed without causing a continued rotation of the motor.

It is a further object of the invention to provide a film feeding circuit which eliminates a wasteful power dissipation by turning a power supply off after the termination of a film feeding operation.

It is yet another object of the invention to provide a film feeding circuit which provides a safety processing in the event perforations in the film cannot be detected over a given time interval during a film feed operation. This allows a positive detection of the stop motion of a film after the full length corresponding to the entire frames of the film has been fed before a safety processing takes place.

It is an yet further object of the invention to provide a film feeding circuit which produces a pair of pulses per perforation of the film. This allows a closer control by utilizing these pulses.

BRIEF DESCRIPTION OF THE DRAWINGS

FIGS. 2 to 5 are circuit diagrams of several embodiments of the invention.

FIG. 6 is a timing chart illustrating the sequence of operations which occur with the embodiment of FIG. 5.

FIGS. 8 and 9 are timing charts illustrating the operation of the embodiment shown in FIG. 7.

DESCRIPTION OF THE PREFERRED EMBODIMENTS

Figure 1:
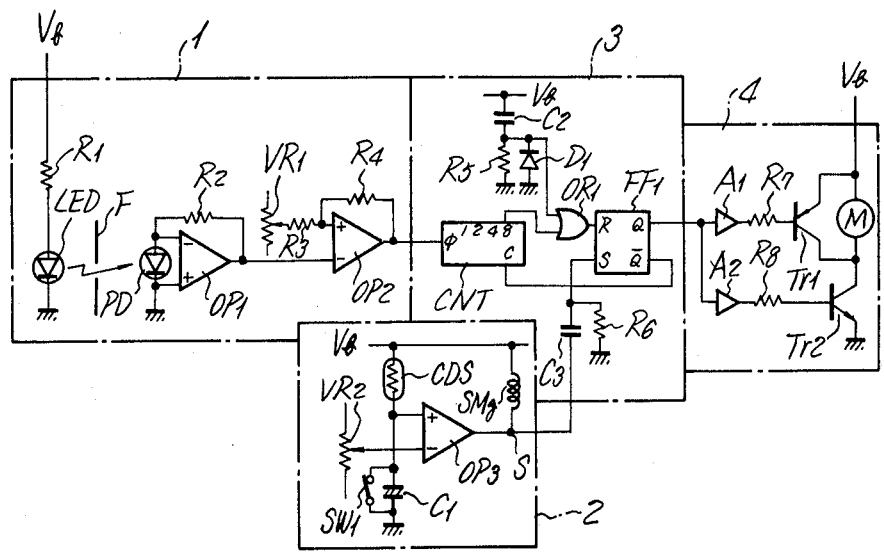
FIG. 1 is a circuit diagram of one form of usual film feeding circuit.

FIG. 1 shows one form of usual film feeding circuit which may be used in a photographic camera. The arrangement includes a perforation detection circuit 1 including light emitting diode LED, photodiode PD, operational amplifiers OP1, OP2, variable resistor VR1, and resistors R1 to R4. The arrangement also includes a shutter drive circuit 2 including photometric elements CDS, capacitor C1, trigger switch SW1, variable resistor VR2, operational amplifier OP3 and shutter electromagnet SMg. Additionally, a counter and control circuit 3 includes a counter CNT, RS-flipflop FF1, capacitors C2, C3, diode D1, resistors R5, R6 and OR circuit OR1. A motor control and brake circuit 4 includes a pair of buffers A1, A2, resistors R7, R8, and transistors Tr1, Tr2. A film drive motor M may be connected to a film take-up spool, for example, and reference character F represents a film and Vb a supply voltage.

When the power supply is turned on, an initial reset circuit comprising capacitor C2, resistor R5 and diode D1 produces a pulse, which is passed through the OR circuit OR1 to reset the flipflop FF1. Consequently, the transistor Tr1 is turned on while the transistor Tr2 is turned off, thus maintaining the motor M at rest. When a release switch of an associated camera is turned on, the shutter drive circuit 2 is activated. Subsequently, the flipflop FF1 is set at the termination of a shutter operation. Specifically, when a mechanical release is operated to open the trigger switch SW1, the capacitor C1 begins to be charged through the photometric element CDS. At this time, the output from the operational amplifier OP3 remains at its low level, and hence the shutter electromagnet SMg is maintained energized. When the voltage across the capacitor C1 reaches a value which is equal to a preset voltage or a divided voltage of a constant magnitude which is developed at the movable tap of the variable rsistor VR2, the output from the operational amplifier OP3 reverts to its high level, whereupon the shutter electromagnet SMg is deenergized.

The output from the operational amplifier OP3 is differentiated by a differentiator formed by the capacitor C3 and the resistor R6 to be supplied to the set input of the flipflop FF1. The flipflop FF1 is set at the termination of a shutter operation in response to the rising end of the output from the operational amplifier OP3. Consequently, the transistor Tr1 is turned off while the transistor Tr2 is turned on, allowing the motor M to rotate to permit the film F which is loaded into the camera to be fed. Simultaneously, the counter CNT is enabled as a result of the inverted output of the flipflop FF1 which has been applied to its clear input reverting to its low level. Consequently, the combination of the light emitting diode LED and the photodiode PD, located at a given position, is operable to detect a perforation or perforations in the film F being fed. Such detected signal is fed through the operational amplifiers OP1 and OP2 to be delivered as a perforation signal, which is counted by the counter CNT. If the film F is of a full size, for example, and thus is formed with eight perforations per frame, the counter CNT operates to produce an output signal after it has counted eight perforation signals. This output signal is passed through the OR circuit OR1 to reset the flipflop FF1. In this manner, the transistor Tr2 is turned off to deenergize the motor M, and is simultaneously the transistor Tr1 is turned on to apply a braking effect upon the motor M, thus completing the feed operation of the film F after the latter has been fed over a distance corresponding to one frame.

In the film feeding circuit described above, the motor M rotates at its full speed after the termination of a shutter operation until the perforation detection circuit 1 detects eight perforations corresponding to one frame of the film. Consequently, if a stop instruction is produced after the detection of the eight perforations to deenergize the motor M, the motor continues to rotate by a coasting operation if the braking force is applied, resulting in a poor accuracy in the stop position of the film F.

Figure 2:
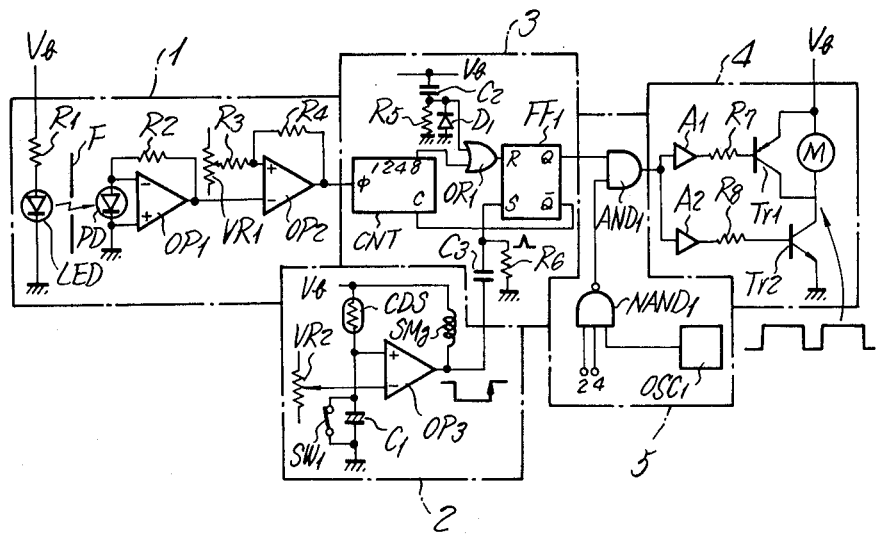

In embodiment of the invention shown in FIGS. 2 and 3, an arrangement is made such that the running speed of the film is reduced before the stop position is reached, as by temporarily interrupting or limiting the power supplied to the motor, thereby achieving an improved accuracy in the stop position of the film.

In the embodiment of FIG. 2, a chopper 5 including AND circuit AND 1, NAND circuit NAND 1 and an oscillator OSC1 is connected between the lipflop FF1 and the buffers A1, A2, both shown in the film feeding circuit of FIG. 1. A second and a third bit output corresponding to outputs of "2" and "4"-digits from the counter CNT are supplied to NAND circuit NAND1, which also receives a pulse from the oscillator OSC1. The output of NAND circuit NAND1 remains at its high level until the counter CNT reaches a count of 6 after the termination of a shutter operation. During such interval, the output from the flipflop FF1 is passed through AND circuit NAD1 to be fed to the buffers A1, A2, allowing the motor M to rotate at its full speed. During the interval when the counter CNT has the count from 6 to 8, the pulse from the oscillator OSC1 is inverted by NAND circuit NAND1, whereby the output from the flipflop FF1 is intermittently disconnected by AND circuit AND1, thus achieving a chopper control of the motor M to reduce the running speed of the film F. When the counter CNT reaches the count of 8 under the condition that the running speed of the film F has been reduced, the flipflop FF1 is reset, whereupon the transistor Tr2 is turned off to discontinue the energization of the motor M. Simultaneously, the transistor Tr1 is turned on to apply an electromagnetic braking effect upon the motor M, thus allowing the film F to be stopped with a good accuracy.

FIG. 3 shows another embodiment of the invention in which a temporary stop circuit 6 including AND circuits AND2 and AND3 and a monostable circuit MM is connected between the flipflop FF1 and the buffers A1, A2, both shown in the film feeding circuit of FIG. 1. A first, a second and a third bit output corresponding to "1", "2" and "4"-digits from the counter CNT are supplied to AND2, so that by the time the counter CNT reaches a count of 7 after the termination of a shutter operation, the output from the flipflop FF1 is passed through AND circuit AND3 and thence through the buffers A1, A2 to allow the motor M to rotate at its full speed. However, when a count of 7 is reached, AND circuit AND2 produces an output of a high level, whereby its rising edge triggers the monostable circuit MM, and the inverted output from the monostable circuit MM turns to its low level, thereby preventing the output of the flipflop FF1 from being passed through AND circuit AND3. In this manner, the energization of the motor M is interrupted, and simultaneously a braking effect is applied to the motor M. The inverted output from the monostable circuit MM returns to its high level before the counter CNT reaches a count of 8, whereby AND circuit AND3 is enabled to energize the motor M again. When the counter CNT reaches a count of 8, the energization of the motor M is interrupted, and a braking effect is applied to the motor M. However, since the motor M will be running at a reduced speed as a result of its re-starting, the film F can be stopped with a good accuracy.

In the film feeding circuit of FIG. 1, if a release switch is depressed when the film F is located such that its perforation is not detected, the flipflop FF1 is set in response to the rising edge of the output from the shutter drive circuit 2 at the termination of a shutter operation, thus allowing the motor M to start. However, since the perforation detecting circuit 1 cannot produce a perforation signal, the counter CNT cannot be stepped up, and hence the motor M continues its rotation.

Figure 4:
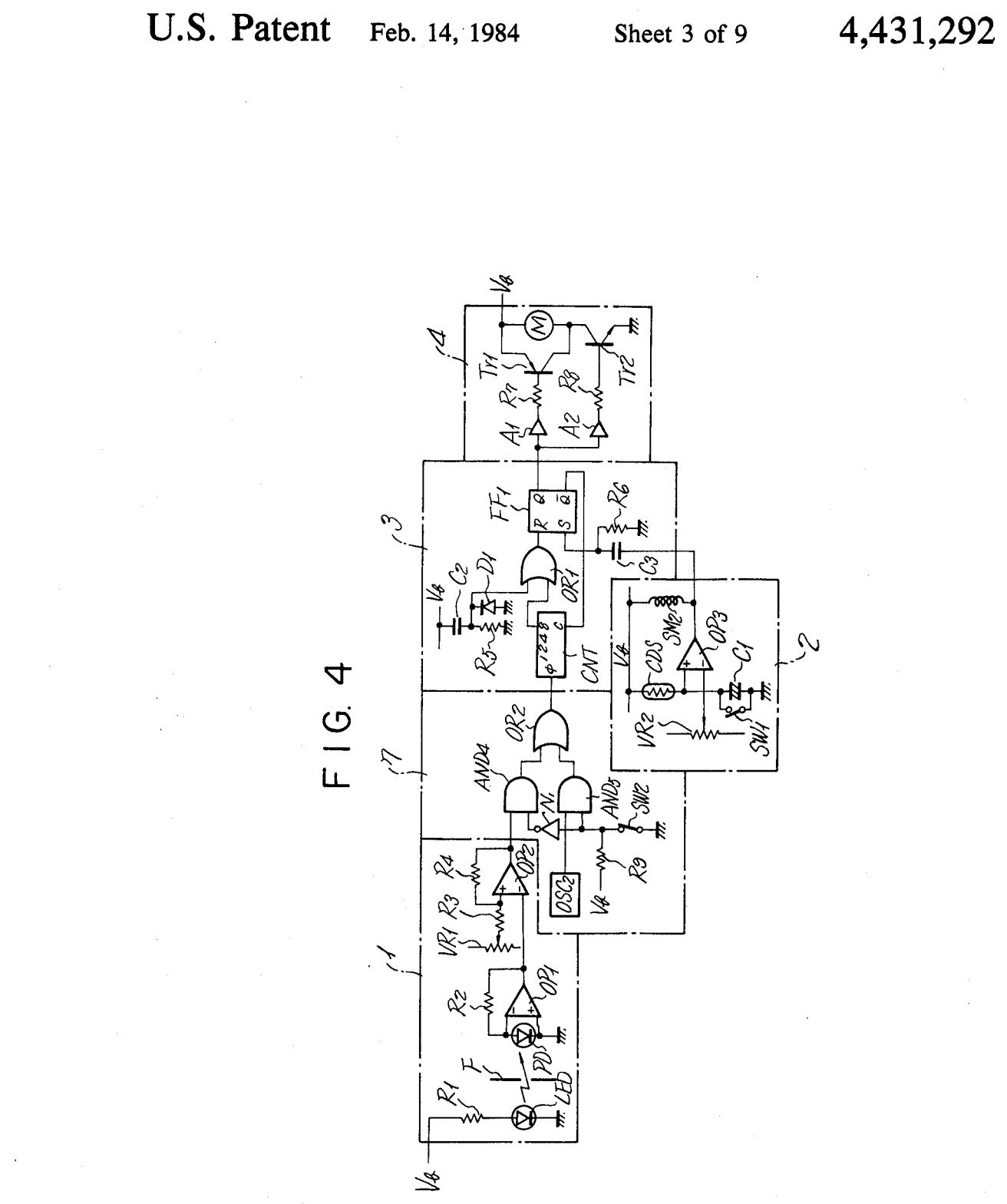

For purpose of safety, some means may be provided which inhibits a shutter release, interrupts the energization of the motor or turns off the power supply in the event a film is not loaded into the camera in the region of taking position (adjacent the location where the perforation is detected). However, the provision of such means will inhibit a camera operation such as film winding operation under the condition when a film is not loaded. FIG. 4 shows a further embodiment of the invention in which a pseudo-perforation signal is supplied to the counter in the event no film is present, thus effectively preventing a continued rotation of the motor and enabling a camera operation in the same manner as if the film were present.

In the embodiment of FIG. 4, a pseudo-perforation signal insertion circuit 7 is connected between the perforation detecting circuit 1 and the counter CNT of the film feeding circuit shown in FIG. 1. The circuit 7 includes a film presence/absence detecting switch SW2, AND circuits AND4 and AND5, OR circuit OR2, inverter N1, oscillator OSC2 and resistor R9.

When the film is present at a taking position on a feeding path which is adjacent the location where a perforation is detected, the switch SW2 is closed to cause the inverter N1 to produce an output of a high level to enable AND circuit NAD4, whereby the perforation signal from the perforation detecting circuit 1 is passed through this gate and OR gate OR2 to be fed to the counter CNT, thus enabling a film feeding operation in the manner mentioned previously.

When the film is not present at a taking position on the feeding path (which is adjacent to the location where a perforation is detected), the switch SW2 is opened. Instead, a pulse from the oscillator OSC2 is supplied as a pseudo-perforation signal to AND circuit AND5 which is then enabled, and through OR circuit OR2 to be supplied to the counter CNT. The motor M stops in response to the counter CNT reaching a count of 8 if the flipflop FF1 is set in response to the rising edge of an output from the shutter drive circuit 2. If a shutter charging is achieved by a rotation of a spool, it is only necessary that the oscillator OSC2 produces eight pulses during a time interval when the spool is in rotation. Thus, the oscillator OSC2 may produce pulses in response to the rotation of a spool or may be free-running. When a free-running oscillator is used, a frequency is chosen in which eight pulses will be produced during the maximum time required for a shutter charging operation.

FIG. 5 shows still another embodiment of the invention in which the power supply is turned off after the termination of a film feed operation, thus eliminating a wasteful power dissipation. A time sequence of such operation is graphically illustrated in FIG. 6. Referring to FIG. 5, a power supply in the form of a battery is shown at B, and the film feeding circuit of FIG. 1 is shown in a block designated FIG1. The bus to which the supply voltage Vb is applied is connected to the power supply B through a switch formed by a transistor Tr3. The arrangement includes transistors Tr3 to Tr5, capacitors C4, C5, release switch SW3, OR circuit OR3, AND circuit AND6, inverter N2, release electromagnet RMg, diodes D2, D3 and resistors R10 to R15, all of which are connected as shown.

When the release switch SW3 is turned on, the capacitor C4 begins to be charged through the diode D2. Simultaneously, the transistor Tr4 is turned on as is the transistor Tr3, whereby the voltage Vb is applied to the bus of the circuit FIG1 of FIG. 1 from the power supply B. Within the circuit FIG1 of FIG. 1, upon application of the supply voltage Vb, the initial reset circuit comprising the capacitor C2, resistor R5 and diode D1 produces a pulse, which resets the flipflop FF1. An inverted output $\bar{Q}$ from the flipflop FF1 is applied to the AND circuit AND6 together with the supply voltage which is fed through the release switch SW3. Since both of these inputs are at a high level, it produces an output of a high level. Consequently, the transistor TR5 is turned on to energize the release electromagnet RMg, thus initiating a mechanical release. In this manner, with the circuit FIG1 of FIG. 1, the shutter drive circuit 2 functions in the manner mentioned above. Subsequently, at the termination of a shutter operation, the flipflop FF1 is set to cause the motor M to rotate, thus feeding the film F. Simultaneously, the counter CNT is enabled, and counts a perforation signal which is produced by the perforation detecting circuit 1 in response to the detection of a perforation in the film F, at a given location. When the counter CNT reaches a count of 8, it produces an output signal, which resets the flipflop FF1, thus interrupting the energization of the motor M and simultaneously applying a braking effect upon the motor M. In this manner, the film F is fed through a distance corresponding to one frame. In the event the release switch SW3 remains on after the film F has been fed through a distance of one frame, the release electromagnet RMg causes another mechanical release to be performed. In this manner, a continued depression of the release switch SW3 enables a continuous photographing operation. A non-inverted output Q of the flipflop FF1 is supplied to OR circuit OR3, which also receives the output S from the shutter drive circuit 2 through the inverter N2. When the release switch SW3 is turned off, at the time the film F has been fed through a distance corresponding to one frame, the Q output of the flipflop FF1 assumes a low level while the output from the shutter drive circuit 2 assumes a high level, whereby the output of OR circuit OR3 assumes a low level. Accordingly, the capacitor C4 discharges through the resistor R10. However, during such time interval, the supply voltage Vb continues to be supplied to the circuit FIG1 of FIG. 1, effectively applying an electromagnetic braking effect upon the motor M. When the capacitor C4 is completely discharged, the transistors Tr4, Tr3 are turned off, whereby the power supply for the circuit FIG1 of FIG. 1 is turned off until the release switch SW3 is turned on for the next time. In this manner, the camera is ready to initiate another release while eliminating any idling current.

In another embodiment of the invention, the absence of a perforation signal over a given time invertal during a film feed operation is detected to interrupt the energization of the motor or to reset the control circuit to its initial condition.

Figure 7:
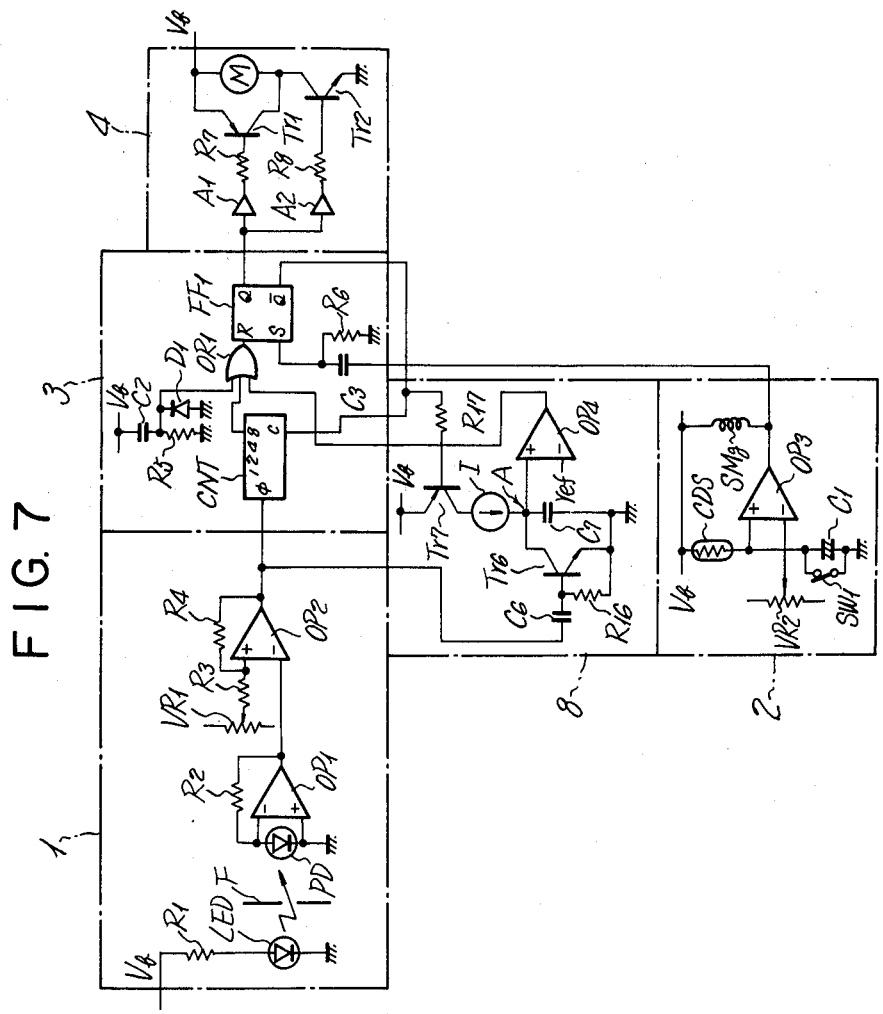
FIG. 7 is a circuit diagram of a further embodiment of the invention.

FIG. 7 shows an embodiment of the invention which is similar to the film feeding circuit shown in FIG. 1, but in which a circuit 8 is provided for detecting the termination of feeding the film over its full length for safety purpose. The circuit 8 includes capacitors C6, C7, transistors Tr6, Tr1, constant current circuit I, operational amplifier OP4 and resistors R16, R17.

In addition to be applied to the counter CNT as a clear signal, the $\bar{Q}$ output from the flipflop FF1 is also applied to the base of the transistor Tr7. Accordingly, the transistor Tr7 is turned on to permit the capacitor C7 to be charged by the constant current circuit I during the film feed operation. On the other hand, a perforation signal from the operational amplifier OP2 is differentiated by a differentiator formed by capacitor C6 and resistor R16 to be applied to the base of the transistor Tr6, which is therefore turned on in response to the rising edge of the perforation signal, thus clearing or discharging the capacitor C7. The potential at a point A or the voltage across the capacitor C7 is compared against a reference voltage ref by the operational amplifier OP4. Thus, when the film F is properly being fed, the perforation signal is substantially periodically produced as indicated in FIG. 8, to clear the capacitor C7, so that the potential at the point A remains below the reference voltage ref, whereby the output of the operational amplifier OP4 remains at its low level. When the full length of the film F corresponding to the entire frames has been fed and the film F comes to a stop, the perforation signal is no longer fed from the perforation detecting circuit 1, as indicated in FiG. 9, and hence the capacitor C7 cannot be reset, causing the potential at the point A to rise. If the perforation signal is absent over a given time interval, the potential at the point A reaches the reference voltage ref, whereupon the output of the operational amplifier OP4 changes to its high level, which is applied through OR circuit OR1 to reset the flipflop FF1. In this manner, the control circuit reverts to its initial condition, and the energization of the motor M is interrupted.

Figure 10:
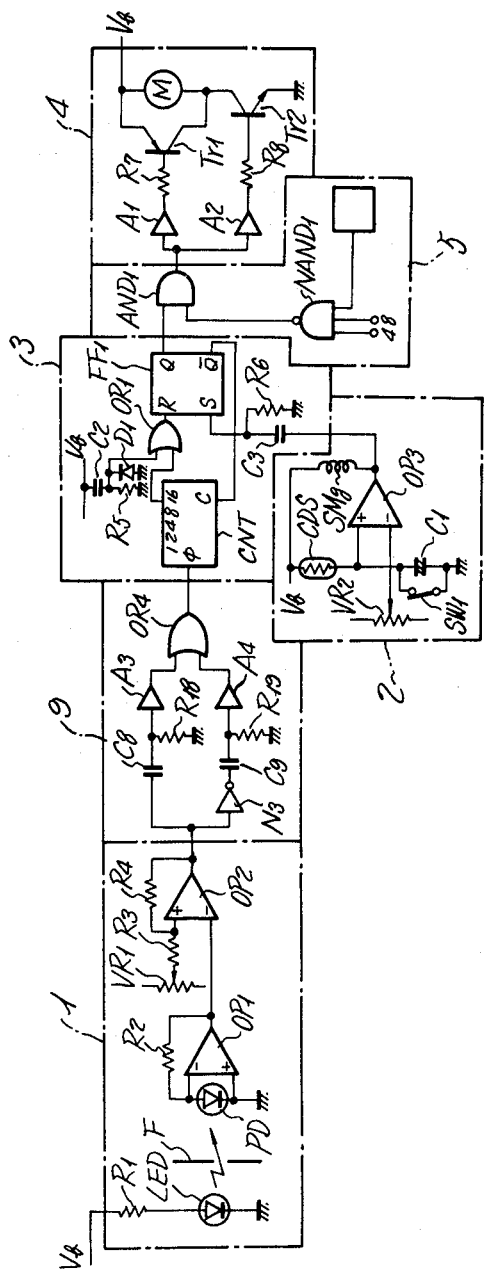
FIGS. 10 to 12 are circuit diagrams of additional embodiments of the invention.

FIG. 10 shows an embodiment which is generally similar to the film feeding circuit of FIG. 2, but in which a counter CNT is capable of counting up to 16 before it produces an output signal and in which a circuit 9 is provided which produces a pulse by detecting a region between the perforation and film portion adjacent to perforations formed in the film F. The circuit 9 includes inverter N3, capacitors C8, C9, resistors R18, R19, buffers A3, A4 and OR circuit OR4. In the circuit 9, the perforation signal from the perforation detecting circuit 1 is differentiated by a differentiator fromed by the capacitor C8 and resistor R18, and the resulting pulse is fed through the buffer A3 to OR circuit OR4, and is also inverted by the inverter N3 before being differentiated by a differentiator formed by the capacitor C9 and resistor R19, the resulting pulse of which is fed through the buffer A4 to OR circuit OR4. Thus, an output pulse is produced by the OR circuit OR4 as an interface between a perforation and an adjacent region which is located between a pair of adjacent perforations or an interface between such region and another perforation of the film passed through the locations which is aligned with the light emitting diode LED and the photodiode PD. In other words, a pair of pulses are produced at the leading edge and the trailing edge of a perforation. The output pulses from the OR circuit OR4 are counted by the counter CNT, and when the count thereof reaches 16, the counter CNT produces an output signal which resets the flipflop FF1, terminating a film feed operation in the same manner as before. In the chopper circuit 5, a third and a fourth bit output corresponding to "4" and "8"-digits from the counter CNT are supplied to NAND circuit NAND1, which also receives a pulse from the oscillator OSC1. Until the counter CNT reaches a count of 12 after the termination of a shutter operation, the output of NAND circuit NAND1 remains at its high level, so that the output of the flipflop FF1 is fed through AND circuit AND1 and thence through the buffers A1 and A2 to permit the motor M to rotate at its full speed. During the time interval when the counter CNT steps from 12 to 16, the pulse from the oscillator OSC is inverted by NAND circuit NAND1, whereby the output of the flipflop FF1 is intermittently supplied through AND circuit AND1, thus achieving a chopper control of the motor M. In this manner, the running speed of the film F is reduced. When the counter CNT reaches a count of 16 under the condition that the film F runs at a reduced speed, the flipflop FF1 is reset to cause the transistor Tr2 to be turned off to thereby interrupt the energization of the motor M and simultaneously cause the transistor Tr1 to be turned on to apply an electromagnetic braking effect upon the motor M, thus allowing the film F to be stopped with a good accuracy.

Figure 11:
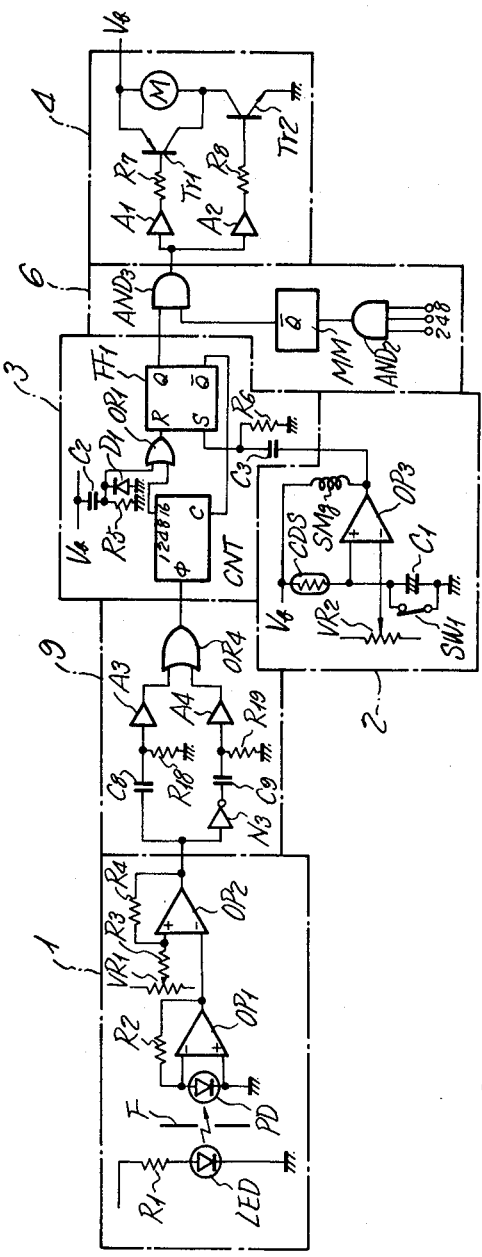

FIG. 11 shows a further embodiment of the invention which is generagally similar to the film feeding circuit shown in FIG. 10, but which includes a temporary stop circuit 6 including AND circuits AND2, AND3, and a monostable circuit MM, and connected between the flipflop FF1 and the buffers A1, A2. A second, a third and a fourth bit output corresponding to "2", "4" and "8"-digits from the counter CNT are supplied to AND circuit AND2 so that by the time the counter CNT reaches a count of 14 after the termination of a shutter operation, the output of the flipflop FF1 is fed through AND circuit AND3 and the buffers A1, A2 to permit the motor M to rotate at its full speed. When the counter CNT reaches a count of 14, the output of AND circuit AND2 changes to its high level, and the rising edge triggers the monostable circuit MM, the $\overline{Q}$ output of which therefore changes to a low level to disable AND circuit AND3, thus preventing the output of the flipflop FF1 from being passed therethrough. Accordingly, the energization of the motor M is interrupted, and simultaneously a braking effect is applied to the motor M. However, the $\overline{Q}$ output of the monotable circuit MM returns to its high level before the counter CNT reaches a count of 16, whereby AND circuit AND3 is enabled again to feed the motor M. When the counter CNT reaches a count of 16, the energization of the motor M is interrupted and a braking effect is applied to the motor M. Since the motor rotates at a reduced speed as a result of its re-starting, the film F can be stopped with a good accuracy.

Figure 12:
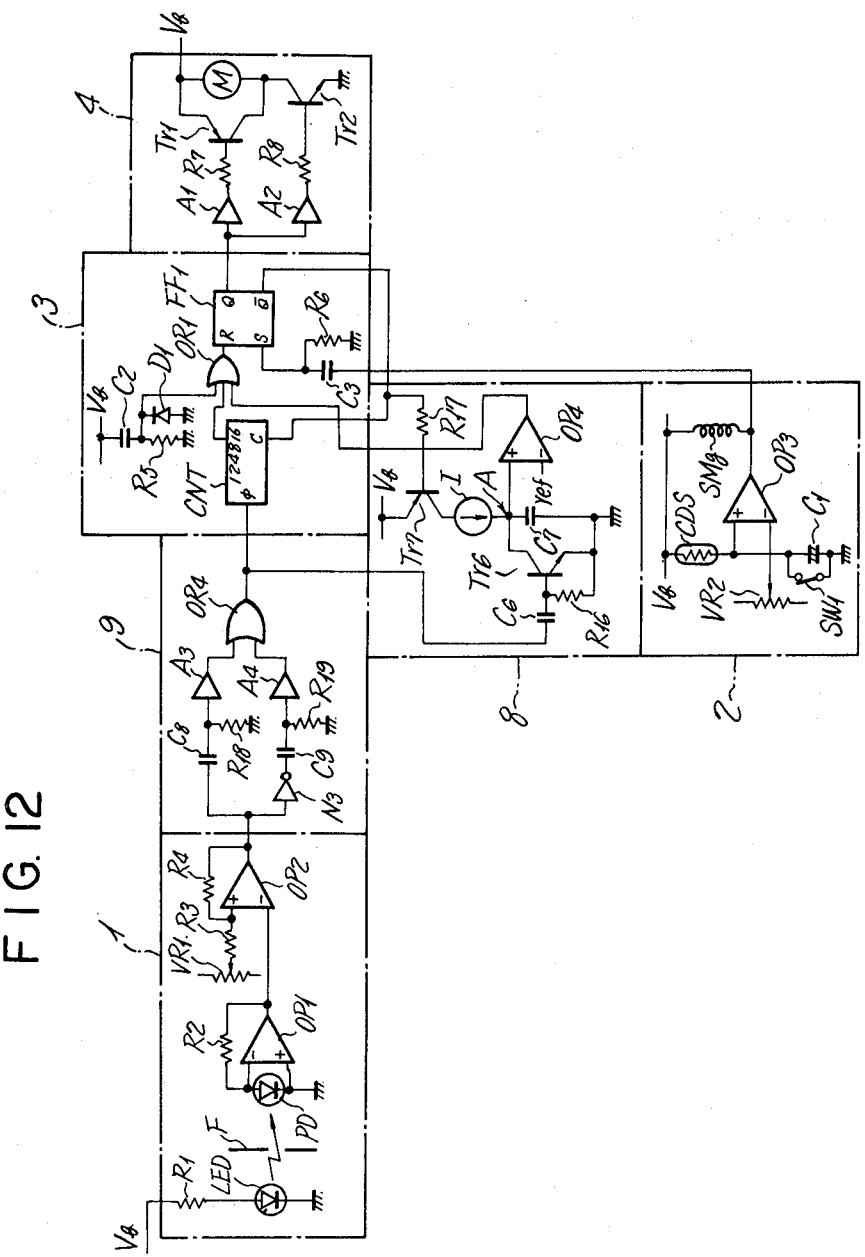

FIG. 12 shows another embodiment of the invention which is generally similar to the embodiment of FIG. 10, from which the chopper circuit is omitted and also including the circuit 8 mentioned previously in connection with FIG. 7 which is operable to detect that the full length of the film has been fed. As compared with the embodiment of FIG. 7, the circuit 8 is arranged to have a reduced period for the input pulses, whereby the accuracy of detection is improved. Where the output pulse from OR circuit OR4 has a reduced duration, capacitor C6 and resistor R16 may be omitted.

Figure 13:
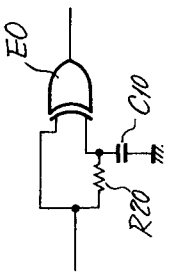
FIG. 13 is a circuit diagram of part of a still further embodiment of the invention.

As shown in FIG. 13, the circuit 9 may be formed by resistor R20, capacitor C10 and exclusive OR circuit EO. In this instance, the perforation signal from the perforation detecting circuit is directly fed to the exclusive OR circuit EO and is also thereto after a time dealy determined by the resistor R20 and capacitor C10, allowing the exclusive OR circuit EO to provide a similar pulse to the output pulse from OR circuit OR4.

What is claimed is:

1. Film feeding circuit comprising a motor for feeding a film in a camera by a distance corresponding to one frame thereof at the termination of a shutter operation, a perforation detecting circuit operative to detect a perforation in the film being fed at a given focation and to produce a perforation signal, a counter for counting the perforation signal, first means responsive to the termination of a shutter operation for driving the motor until a count in the counter reaches a first predetermined value, and control means for controlling the film feeding operation which control means causes the speed of the motor to be reduced after the count in the counter reaches a second predetermined value which is less than said first predetermined value.

2. Film feeding circuit according to claim 1, further including a chopper which intermittently interrupts the drive to the motor after the count in the counter reaches the second value, thereby reducing the speed of the motor.

3. Film feeding circuit according to claim 1, further including a momentary stop circuit for interrupting the drive to the motor for a given time interval when the count in the counter reaches the second value, thus reducing the speed of the motor.

4. Film feeding circuit according to claim 1 in which the control means supplies a pseudo-perforation signal to the counter in the event the perforation detecting circuit fails to produce the perforation signal in the absence of the film.

5. Film feeding circuit according to claim 4 in which the perforation detecting circuit comprises a switch for detecting the failure of occurrence of the perforation signal in the absence of the film, a pulse oscillator, and means for supplying the pulse produced by the oscillator in the absence of the film in response to the detection of the failure of occurrence of the perforation signal by the switch.

6. Film feeding circuit according to claim 1 in which the control means turns the power to the circuit on when a film feeding operation is initiated and turns the power off when a film feeding operation is completed.

7. Film feeding circuit according to claim 6, further including a switch for turning the power on and off, and means for turning the switch on in response to the closure of a shutter release switch and for turning the switch off after the motor comes to a stop.

8. Film feeding circuit according to claim 1 in which the control means effects a security processing when it detects the failure of occurrence of the perforation signal over a given time interval during the film feeding operation.

9. Film feeding circuit according to claim 8, further including a circuit rendered operative by a signal from the first means during the film feeding operation to stop the motor in response to the detection of the failure of supply of the perforation signal from the perforation detecting circuit over a given time interval.

10. Film feeding circuit according to claim 1 in which the control means detects a region of the film located between the perforation and a film portion between adjacent perforations, thereby producing a pair of pulses per perforation.

11. Film feeding circuit according to claim 10, further including a circuit which produces and supplies to the counter pulses in response to the leading and the trailing edge of the perforation signal from the perforation detecting circuit.

12. Film feeding circuit according to claim 11, further including a chopper for intermittently interrupting the drive to the motor after the count in the counter reaches a given value, thereby reducing the speed of the motor.

13. Film feeding circuit according to claim 11, further including a temporary stop circuit for interrupting the drive to the motor for a given time interval when the count in the counter reaches the given value.

14. Film feeding circuit according to claim 11, further including a circuit rendered operative by a signal from the first means during a film feeding operation to stop the motor in response to the absence of the perforation signal supplied from the perforation detecting circuit over a given time interval.

* * * * *